(12) United States Patent
Chrysanthakopoulos

(10) Patent No.: US 11,701,972 B1
(45) Date of Patent: Jul. 18, 2023

(54) MULTI-PURPOSE ROBOT

(71) Applicant: dCentralized Systems, Inc., Seattle, WA (US)

(72) Inventor: Georgios Chrysanthakopoulos, Seattle, WA (US)

(73) Assignee: dCentralized Systems, Inc., Seattle, WA (US)

(*) Notice: Subject to any disclaimer, the term of this patent is extended or adjusted under 35 U.S.C. 154(b) by 0 days.

(21) Appl. No.: 17/111,495

(22) Filed: Dec. 3, 2020

Related U.S. Application Data

(60) Provisional application No. 62/943,148, filed on Dec. 3, 2019.

(51) Int. Cl.
*G05D 1/02* (2020.01)
*B60L 15/20* (2006.01)
*A01B 79/00* (2006.01)
*H02S 10/40* (2014.01)
*H02J 7/35* (2006.01)
*B60L 8/00* (2006.01)
*G05D 1/00* (2006.01)

(52) U.S. Cl.
CPC .......... *B60L 15/20* (2013.01); *A01B 79/005* (2013.01); *G05D 1/0214* (2013.01); *H02S 10/40* (2014.12); *B60L 8/003* (2013.01); *B60L 2240/427* (2013.01); *G05D 1/0088* (2013.01); *G05D 2201/0201* (2013.01); *H02J 7/35* (2013.01)

(58) Field of Classification Search
CPC .... B60L 15/20; G05D 1/0214; G05D 1/0088; G05D 2201/0201
See application file for complete search history.

(56) References Cited

U.S. PATENT DOCUMENTS

| | | | | |
|---|---|---|---|---|
| 8,606,451 | B2* | 12/2013 | Abdel-Baqi | H02P 9/04 701/50 |
| 11,387,756 | B1* | 7/2022 | Khosravi | H02P 21/22 |
| 2004/0193339 | A1* | 9/2004 | Hulden | G05D 1/0272 701/23 |
| 2013/0025248 | A1* | 1/2013 | Kraft | A01D 34/008 701/25 |
| 2014/0343802 | A1* | 11/2014 | Pichlmaier | A01B 63/112 701/50 |
| 2016/0150739 | A1* | 6/2016 | Fisher | G05D 1/0212 701/25 |
| 2020/0017096 | A1* | 1/2020 | Fukuda | B60L 7/12 |

* cited by examiner

*Primary Examiner* — Tan Q Nguyen
(74) *Attorney, Agent, or Firm* — Bochner PLLC; Ariel Reinitz

(57) ABSTRACT

Aspects of the present disclosure are presented for a multi-purpose robot. In certain implementations, the robot of the present disclosure can initiate performance of one or more tasks. Aspect(s) of the power consumption of the robot can be monitored. Input(s) originating from sensor(s) of the robot can be received. Based on the aspect(s) of the power consumption of the robot and input(s) originating from the sensor(s), aspect(s) of the performance of the one or more tasks can be adjusted.

20 Claims, 12 Drawing Sheets

| Mow & Trim | Haul | Groom |
|---|---|---|
| Finish — 302 | Cart — 310 | Blade — 318 |
| Brush — 304 | Pull Spreader — 312 | Rake — 320 |
| Flail — 306 | PTO Spreader — 314 | Box Blade — 322 |
| String Trimmer — 308 | Electric Sprayer — 316 | Arena — 324 |

FIG. 3

MULTI-PURPOSE ROBOT

CROSS-REFERENCE TO RELATED APPLICATION

This application is related to and claims the benefit of priority to U.S. Patent Application No. 62/943,148, filed Dec. 3, 2019, which is incorporated herein by reference in its entirety.

TECHNICAL FIELD

Aspects of the present disclosure generally pertain to robotics. More specifically, the present disclosure relates to a multi-purpose robot.

BACKGROUND

Robots can be configured to autonomously perform various actions or operations. In industries such as agriculture, robots remain underutilized.

BRIEF DESCRIPTION OF THE DRAWINGS

Some embodiments are illustrated by way of example and not limitation in the figures of the accompanying drawings.

FIG. 3 shows a series of implements that the robot of the present disclosure may be configured to attach to, according to some embodiments.

DETAILED DESCRIPTION

Aspects of the present disclosure are presented for a multi-purpose robot capable of pushing or pulling heavy loads in an energy-efficient manner. In a number of use cases, the robot may be configured for use in land care, such as in agriculture or on rural properties, performing tasks that until now are still performed by existing farm equipment or vehicles. Examples of such tasks include mowing, hauling, grading, grooming, spraying, tilling, drilling, augering, loading, spreading, and trenching. In certain implementations, the robot of the present disclosure can be configured to handle many such tasks by attaching to it multiple types of accessories or other work equipment, such as those used in the farm industry. Some of these accessories (e.g., a mower deck) may require power (electrical or mechanical) to perform certain operations (and may be referred to herein as "implements"). Other such accessories (e.g., a basic cart) may not require power (and may be referred to herein as "attachments").

Further aspects of the described robot include enhancements and optimizations that ensure the robot is efficiently utilizing its stored power. For example, while certain implementations of solar power have been unable to generate high peak power, the described robot is engineered to harness enough energy from solar power to handle heavy loads and perform other power-intensive tasks.

In some embodiments, the robot can be programmed to autonomously navigate a large area (i.e., without being driven or operated by a human). In some embodiments, the robot can automatically negotiate around or through obstacles during its programmed route.

Aspects of the present disclosure include a robot capable of heavy work and efficient power management. For example, such a robot can be configured to limit or stop work when it does not have sufficient charge, facilitate recharging (e.g., via solar power or other sources), and resume work when it has sufficient charge.

Figure 1:
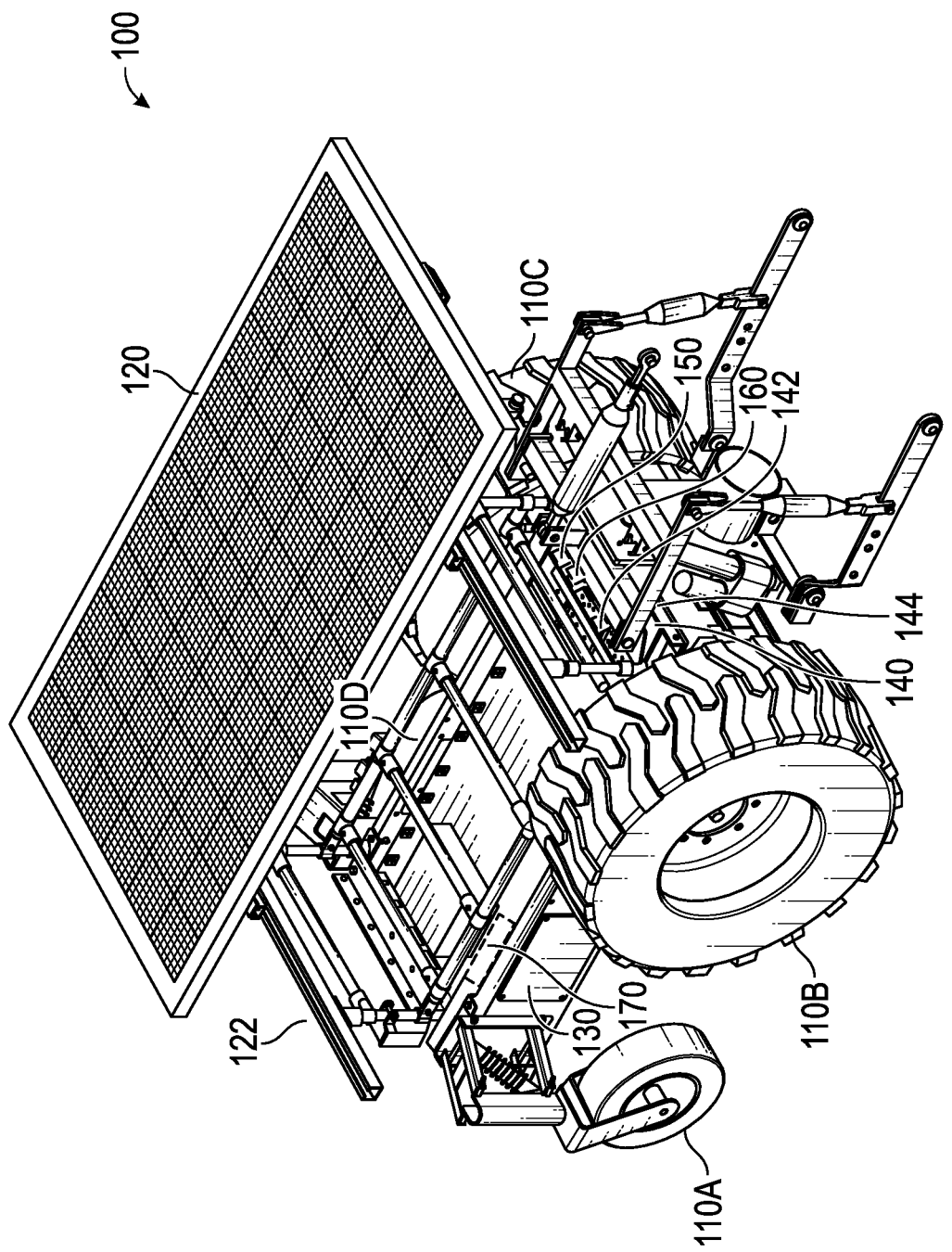
FIG. 1 shows an illustration of a solar charged, heavy work, multi-purpose robot, according to some embodiments.

FIG. 1 depicts an example heavy work, multi-purpose robot 100, according to some embodiments. As shown, robot 100 includes four wheels 110A-D and a solar panel 120. The robot may include the ability to attach to one or more standard implements, with 2" or 3PT hitches, for example. The robot may include a battery 170 coupled to the solar panel 120. The referenced battery can also be configured to charge from other power sources (e.g., grid-charged).

Robot 100 can be further configured with various power management technologies that enable the robot to efficiently utilize stored power under various conditions. Such technologies can, for example, protect the robot's battery such that the robot stops work on a low charge and resumes autonomous work when the robot is sufficiently charged.

In certain implementations, robot 100 can include various other components. For example, robot 100 can incorporate an efficient robot chain drive that can be easily repaired. The robot can also include various wheel and caster arrangements that allow for zero turn capabilities. Permanent magnet DC motors may be included to produce over 1400 lb·ft of torque, carry up to 4000 lbs. directly on the chassis or pull over 7000 lbs., for example.

Robot 100 can include chassis 130. In certain implementations, chassis 130 can be constructed of a steel frame with one or more bends. Doing so can reduce production costs and costs for replacement parts while providing a substantial amount of strength. For example, chassis 130 may be made of a single piece of 3/16" (7 ga) steel, with 4 bends, with no welds, thus being formed of a single part. Chassis 130 can "wrap" around the batteries, protecting them. It may have hole patterns to support the solar support "cage" 122, plus an optional rack, and allows for modular wheel/caster assemblies. The front access allows removal of reduction units, in the field, for maintenance, without any other part having to be removed. In addition, the chassis may be stacked, one of top of each other, for doubling the battery capacity.

Robot 100 can be further configured with various power-utilization technologies. Such technologies (and others described herein) can be implemented in whole or in part via processor(s) 150. Further aspects of processor(s) 150 and other components of robot 100 are described herein, e.g., with respect to FIG. 10. Such processor(s) 150 can execute instructions, initiate operations, etc., including task-specific learning capabilities which can determine how to efficiently utilize available power in relation to a given task.

For example, the described power utilization technologies can include real-time speed reduction when power use increases, and the ability to disable auxiliary implements when revisiting a location that has already been worked on (e.g., in the robot's programmed path). In some cases, the robot can also identify or determine the load it is carrying, the implement it is using, and/or its environment, and can further adjust its power usage and/or movement pattern accordingly (e.g., to conserve power).

In some embodiments, solar panel 120 can include a positionable solar panel capable of sliding and/or tilting. Such a solar panel can be configured with adjustable height capabilities to allow bifacial panels to operate efficiently, at adjustable or fixed angles. Such a sliding mechanism can allow the panel to be easily added and removed. In addition, the ability to slide the solar panel allows easy access to the components inside the frame (e.g., to repair or diagnose other pieces, change load capacities, etc.). Several of the described solar panels can also be configured together on a single robot in a multi-panel configuration.

In some embodiments, robot 100 can also include or incorporate various sun tracking technologies. For example, such sun tracking technologies can utilize a two-dimensional motion model (e.g., as generated by the robot) and learning topology, and elevation differences to angle the robot/solar panel to improve insolation and angle.

Robot 100 can also be configured to identify or learn and avoid shady spots (e.g., when robot 100 is in charge mode). Such areas can be identified or determined based on correlations with GPS position, time of day and time in the year. Additionally, in certain implementations other sources (e.g., databases or other external repositories storing such information) can be utilized to compute such determinations. The robot can also be configured to adjust its position if it determines the current position may be suboptimal (e.g., for solar charging). For example, the robot can be configured to identify (e.g., based on visual tags or identifiers in its surrounding area) optimal, user-suggested solar charging locations, including any coordinates or landmarks. In some cases, stored maps or other overhead topologies may be included and also may contain tagged locations designated as recommended solar charging areas. Accordingly, the robot can generate an "insolation" map that accounts for topography, shading, time of year, and the various other inputs. Using this stored and received information, the robot can identify an optimal location and/or position at which to park itself when idle in order to optimally charge, and can further orient itself accordingly and automatically make adjustments thereto from time to time (e.g., based on changing environmental conditions).

As noted, robot 100 can include solar panel 120 that allows the robot to charge while operating or performing other tasks (e.g., mowing with an electrified deck). Solar panel 120 can also be configured to prevent the robot from discharging. Since robot 100 can operate autonomously, the robot can be configured to monitor its power level and consumption, and can stop operating when it reaches a defined (e.g., low) power level. After charging (e.g., up to a defined threshold), robot 100 can resume operating. The length of time and/or charging threshold can change based on various circumstances. For example, in some embodiments, between April and September, at northern latitudes, robot 100 can fully recharge within two days, while in other places and/or at other times recharging may take less or more time. In other embodiments, the robot may be charged from other power source(s) (e.g., grid electricity).

Figure 2:
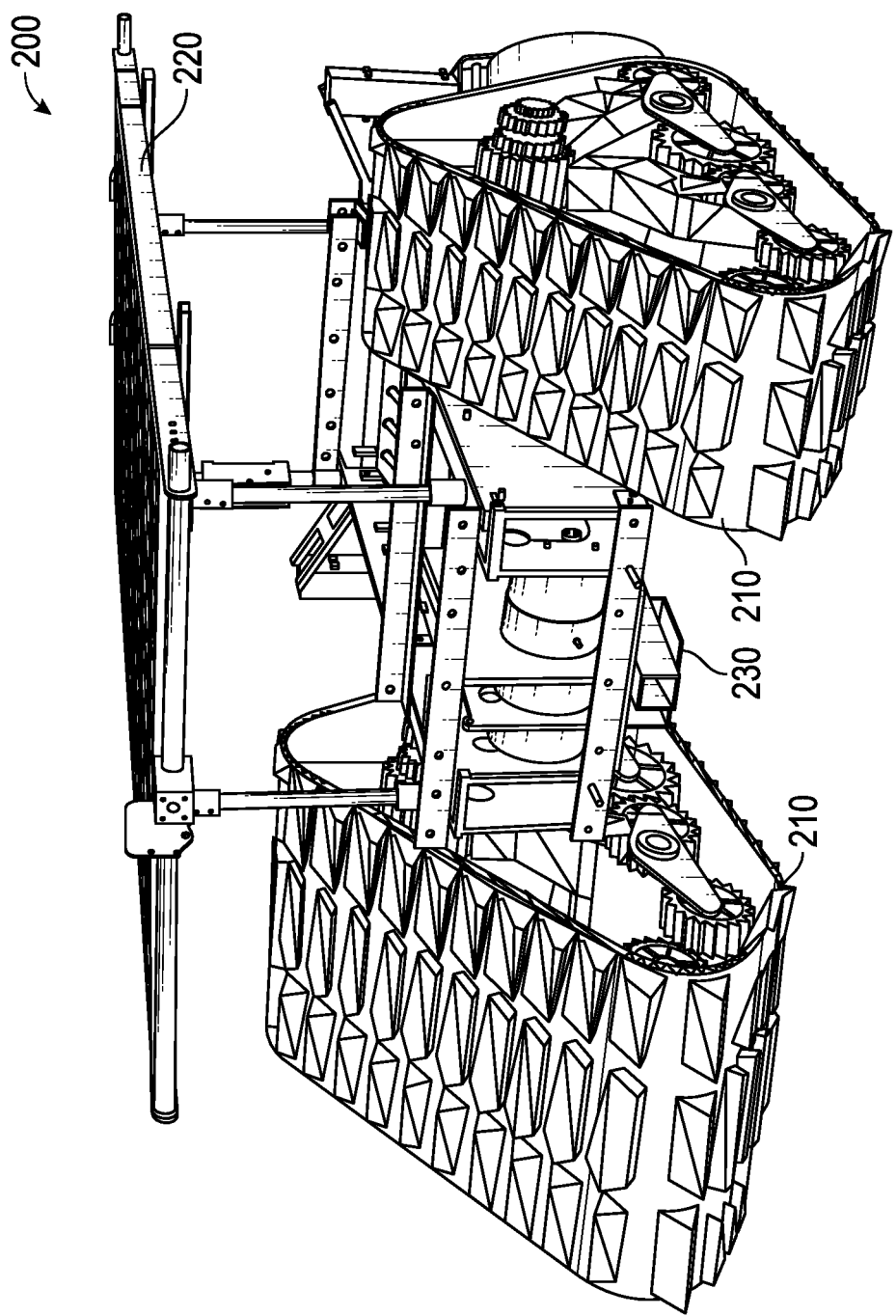
FIG. 2 shows the robot including treads instead of wheels, according to some embodiments.

FIG. 2 shows another implementation of the described robot. As shown in FIG. 2, in certain implementations robot 200 can be configured with treads 210 (e.g., instead of wheels 110 as shown in FIG. 1). The chassis 230 and the solar panel 220 (as well as various other components described herein with respect to robot 100) can be comparable to those described with respect to robot 100, configured for operating with treads 210. Depending on the terrain, the described robot may be better suited when equipped with the treads 210, while in other cases, wheels 110 (as shown in FIG. 1) may be more efficient.

FIG. 3 shows multiple accessories (e.g., implements and attachments) 302-324 that the described robot can be configured to attach to or be attached to. In certain implementations, multiple accessories can be configured in various arrangements (e.g., attached to the robot simultaneously, on different sides or on the same side of the robot, attached to the robot directly or daisy chained, etc.) according to some embodiments. The robot can be configured with enough power to haul, deliver mechanical and/or electrical power to or otherwise utilize the referenced accessories. As described herein, the described robot can be further configured to utilize such implements or attachments while accounting for the power available to the robot and the task(s) the robot is to perform. As such, the robot can be configured to perform power-intensive tasks even in scenarios in which solar power may be the robot's only energy source.

Figure 4:
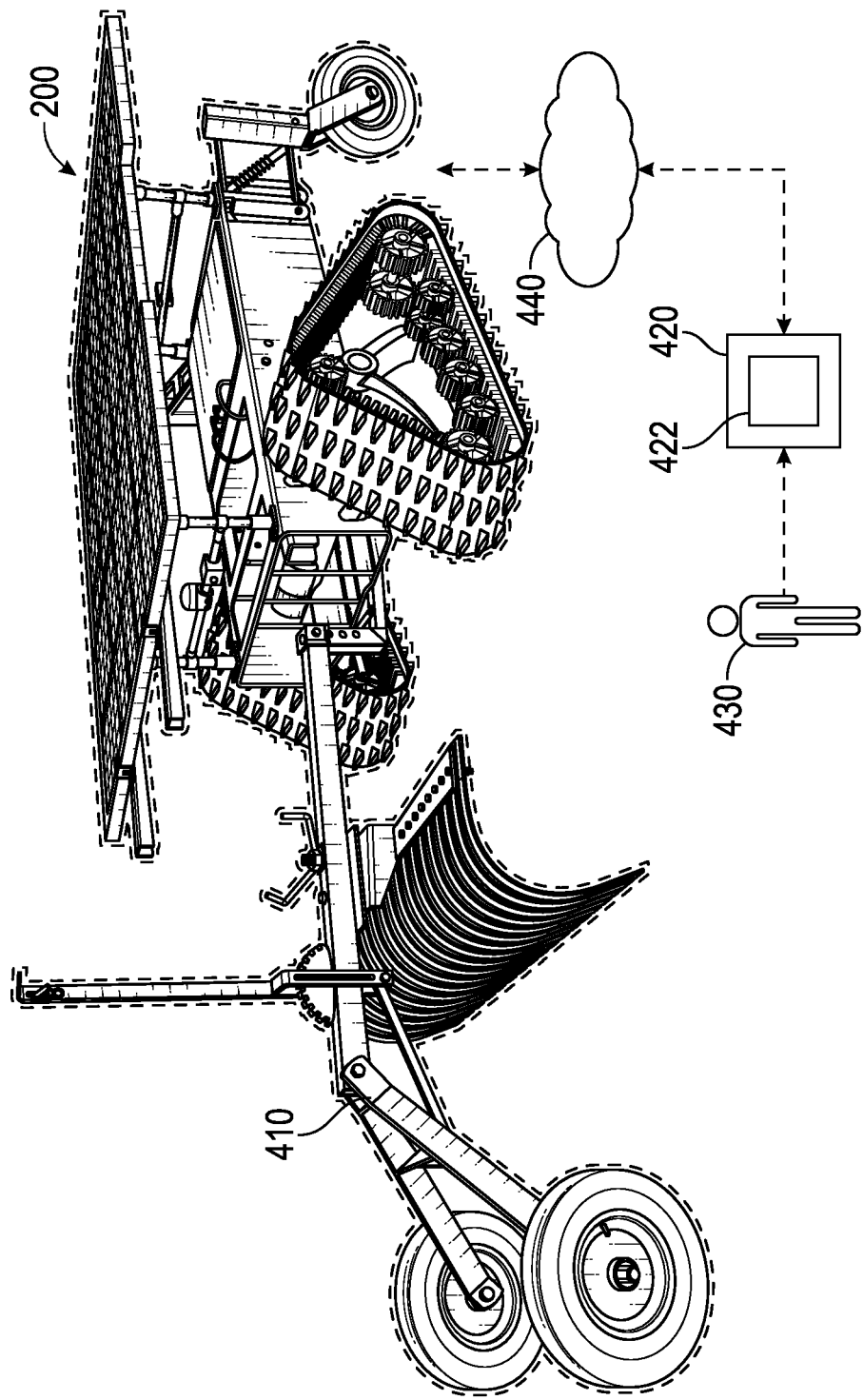
FIG. 4 shows one example of the robot with an agricultural implement attached to it, according to some embodiments.

FIG. 4 shows an example of robot 200 with an agricultural implement 410 attached to it, according to some embodiments. The tasks needed to successfully cultivate land for agricultural use may require large amounts of power. Existing solar-charged vehicles may be unable to generate sufficient power. In contrast, the described robot can be configured to efficiently harness available solar energy such that the robot can generate sufficient power to operate the described implement(s) in the field.

For example, robot 200 may be capable of producing 30 KW/42 HP peak power and 1400 ft. lbs torque using energy stored from a 400 W bi-facial, high efficiency solar panel. In some embodiments, even when good torque is being generated, the voltage may be just 5V across the motor. This amounts to consuming just 70 A*5V=350 W when 30% of the torque is being applied, equaling 200 A across both driven wheel motors, the energy consumption can be as low as 600 Watts (as compared to the 30 KW peak), since the described technologies can reduce speed (and thus voltage), while maintaining enough voltage to move the robot forward with minimum power consumption. Thus, runtime of the robot, while mowing is essentially limited only by the amount of sun it is exposed to and the capacity of its battery system. Given a 10 KWh battery capacity, the robot may be capable of operating for 18 hours a day (e.g., on sunny days, while pulling a light load such as for certain types of mowing), for example.

The described robot incorporates various additional enhancements and improvements. For example, robot 100 can include a frame configured to fit four 200 Ah lead acid 4D batteries, positioning the robot as low to the ground and driven axle as possible to provide a low center of gravity. The robot can also be configured to multiply the torque output of the motor, e.g., by converting RPM to torque (allowing the robot to convert the 4000 rpm at the motor shaft to just 70 rpm at the driven axle) with minimal power loss.

Additionally, the described robot can include solar support 122 (e.g., as shown in FIG. 1) that can be configured to allow for the use of a variety of solar panels, in many configurations and angles, and allow for sliding of the panels. The robot can also include solar charge electronics configured to maximize power extraction under changing conditions (e.g., using maximum power point tracking (MPPT) techniques). Additionally, robot 100 can incorporate power management enhancements that protect batterie(s) 170 from depletion and resume autonomous work when battery charge level is above a defined threshold. The robot can also be configured to record and/or track information associated with various location(s), e.g., to determine locations that may be optimal for solar recharging (e.g., at different times over the course of the day).

In some cases, robot 100 can include a battery system that can store 10 KWh of energy. Robot 100 can be configured to operate until the combination of power stored in the battery system and real-time power produced by the solar panel no longer allows the robot to operate at desired performance. Upon determining the stored and/or received power is no longer sufficient to perform task(s) assigned to the robot, the robot can enter a charging mode, and/or can automatically move itself to a location determined to be better suited for solar charging or other types of charging (e.g., grid-charging).

In some embodiments, robot 100 can be configured to autonomously navigate in relation to multiple waypoints. In doing so, the robot can, for example, exhaustively traverse a specified area of land. Moreover, in certain implementations the robot can be further configured to traverse such land area(s) in a manner that accounts for and conserves available energy. Additionally, in some embodiments, the robot can be equipped with various sensor(s) 160 configured to enable the robot to sense and navigate terrain. Examples of such sensors include but are not limited to, GPS, inertial measurement unit ("IMU") (which can incorporate an accelerometer, gyroscope, magnetometer, and other sensors), optical sensors (e.g., cameras), proximity sensors, sonar, etc. These and other such sensors are described and depicted herein, e.g., with respect to FIG. 10.

Robot 100 may also be configured to detect adverse terrain and obstacles, and to further adjust its operation to account for them, e.g., without human intervention. Such technologies can be advantageous in multiple scenarios. In one example scenario, the robot may not be moving (translating, rotating) as expected, though its wheels are not spinning/slipping ("stalled with full traction"). In another example scenario, the robot may not be moving (translating, rotating) as expected while one or more wheels are spinning/slipping ("stalled without full traction"). Depending on the scenario, the robot can adjust aspects of its operation, e.g., in an effort to restore or improve its ability to maneuver or perform other tasks, as described herein.

For example, robot 100 can include sensors an inertial measurement unit incorporating sensors such as a magnetometer, an accelerometer, and a GPS unit. Input(s) originating from such sensor(s) can be processed (e.g., by processor(s) 150) to detect the operation status of the robot which can reflect, for example, various stalled conditions (e.g., scenarios in which the robot is not moving or not moving as expected/desired). Upon detecting such condition(s), the robot can be further configured to take corrective action. Doing so can be advantageous because, under certain circumstances, robot 100 may encounter conditions that make certain operations difficult (particularly when operating unsupervised). For example, conditions such as weather, soil, holes, rocks, fallen branches/trees and other obstacles can make ongoing operation/navigation difficult. Accordingly, the described technologies can be configured to detect such conditions and adjust operation of the robot to account for them (e.g., without human intervention).

In one example scenario, though robot 100 is applying power to one or both wheels (e.g., attempting to maneuver or perform another task), the wheel(s) are free spinning or have otherwise lost some or all of their traction. As a result, the robot is stalled, digging a rut, and/or is otherwise not making the expected progress translating or rotating.

Robot 100 can be configured to detect such a scenario (e.g., when it is stalled) and can further adjust its operation to account for it. For example, robot 100 can receive input(s) originating from one or more sensor(s). Such sensor input(s) can be processed, e.g., by measuring a time series of acceleration data, and/or variance in acceleration vector values. In doing so, vibration of the robot can be detected and/or whether the robot is in motion can be determined.

Moreover, in certain implementations other sensor input(s) (e.g., a time series of inputs or headings originating from the referenced magnetometer) can be processed to measure or otherwise determine the rotation delta of the robot. Such a rotation delta can be compared with an estimated rotation delta (which can be computed or otherwise estimated based on the power being utilized by the robot). In other implementations input(s) originating from the referenced GPS unit can be processed to determine or otherwise compute the movement or translation of the robot (e.g., while the robot is spinning its wheels or performing other operation(s)). Translations so determined can be compared with an estimated (open loop) translation during the same time interval (e.g., based on the power applied to or being used by the robot for its wheels).

Based on a determination (e.g., by processor(s) 150) that the error or difference between the actual and estimated rotation and/or the actual and estimated translation is greater than a defined threshold, various aspects of the robot's operation can be adjusted. For example, the power applied to one or more wheels 110 can be changed, thereby enabling the robot to un-stall and/or regain traction. In a scenario in which robot is attempting to perform a turn, various aspects of the robot's operation can be adjusted, e.g., by changing or increasing the robot's turn radius. Doing so can, for example, enable the robot to travel in a straighter or more even manner, balancing power more evenly to both wheels. It should be understood that the described adjustments are provided by way of example, and that any number of other adjustments can also be implemented (e.g., to enable the robot to un-stall and/or regain traction).

Robot 100 can be configured with technologies that enable it to efficiently utilize its stored power under changing conditions (e.g., while navigating across different types of terrains and/or performing multiple tasks). For example, upon receiving a motion command (e.g., from a user or higher-level planner) robot 100 can determine the minimum power needed to perform the received command. Additionally, robot 100 can detect (e.g., in real time) stall (e.g., whether a wheel or motor implement is not rotating) and/or or traction loss (e.g., the motor is rotating too fast, performing no or less-than-expected work without moving the robot as expected or implement effector, etc.). Based on such detection(s), robot 100 can adjust its operation to compensate for such conditions while accounting for available power.

In certain embodiments, robot 100 can periodically or repeatedly check or otherwise determine if one or more of its wheels has stalled. Based on such a determination, the robot can adjust aspects of the operation of one or more wheels (e.g., power consumption, targeted orientation, etc.). For example, if the described stall check reflects that one or more wheels are stalled (partially or fully), the robot can adjust its operation by increasing the power to one or more wheels (e.g., to compensate). In another example, if the described stall check reflects that no wheels are stalled (partially or fully), the robot can adjust its operation, e.g., by decreasing the power directed to or consumed by one or more wheels.

Robot 100 can also be configured to periodically or repeatedly check or otherwise determine if one or more of its wheels have lost traction. Based on such a determination, the robot can adjust aspects of the operation of one or more wheels (e.g., power consumption, targeted orientation, etc.). For example, if the described traction check reflects that one or more wheels have lost traction are stalled (partially or fully), the robot can adjust aspects of the operation of one or more wheels (e.g., to enable them to regain traction or otherwise compensate).

In some embodiments the location of the robot and/or other parameters (e.g., slope, weather), can be used to determine or learn advantageous way(s) to compensate for a stall or traction loss.

In certain implementations, the referenced detections (e.g., with respect to an operation status of the robot such as stall and/or traction loss) can be computed based on inputs or feedback that reflect the voltage being consumed by one or more motor controller(s) 142, such as those that modulate power to motor(s) 140 of robot 100. For example, in certain implementations, each wheel can be associated with its own motor, allowing each wheel to be controlled independently. Accordingly, in certain implementations the described detections and adjustments (e.g., with respect to stall and/or traction loss) can be performed on a per-wheel basis. In other implementations, such operations can be performed with respect to two or more wheels (e.g., in relation to one another). In doing so, stall and traction loss (and/or other operation statuses of the robot) can be determined and operation of the robot can be adjusted accordingly, thereby enabling the robot to operate effectively in steep terrain, rough terrain, mud, high grass, snow, while efficiently utilizing power needed to achieve such operations.

By way of further example, in certain implementations motor(s) 140 or robot 100 can be configured with motor control reference(s). In various implementations, such motor control reference(s) can be single or multi-channel references for the driven motors or discrete motor control references (e.g., with single channel each, one for each drive motor).

Robot 100 can be further configured to convert a normalized velocity vector (x,y,z) into a power request (e.g., per channel). The robot can further interpret or otherwise compute radius and zero turn constraints before computing the power request to each drive motor service. For example, robot 100 can monitor one or more motor controller data sample streams (originating from motor controllers 142) to determine stall and/or traction loss conditions. In certain implementations, robot 100 can compute or identify an estimated voltage expected with respect to motor lead in relation to a given power command. Such estimated voltage can be compared with voltage actually being expended at a given motor. In doing so, an operation status of the robot such as traction loss and/or stall can be determined. For example, if the actual voltage is lower than the expected voltage by more than a certain threshold amount, one or more wheels can be determined to have lost some or all of their traction.

Additionally, in certain implementations the described technologies can monitor current (e.g., as used at a given motor) to determine load and traction loss. Voltage consumed can also be used in determining RPM of a motor. For example, the rotation speed of a DC electric motor shaft (the rotor) is proportional to voltage. Based on this and information about the motor winding resistance and motor controller circuit resistance, the rotation speed of the shaft can be determined with high degree of accuracy, e.g., by measuring the voltage across motor leads 144. When a certain pulse-width modulation (PWM) power level is commanded through the motor controller, the power level it will be translated to (in terms of voltage across the motor leads) can be determined. If the motor can spin freely, the measured voltage is likely to match the expected voltage. If the motor rotor is stalled, the voltage measured is likely to be much less the expected voltage, given the commanded power level.

In certain implementations, the described technologies can be further configured to process multiple inputs/outputs to enable efficient navigation of robot 100 under various conditions. For example, robot 100 can be configured to receive or monitor inputs originating from path planner streams, differential drive streams, pose estimation streams, obstacle avoidance streams, and/or motor controller streams. Such inputs can be processed and based on various determination(s), performance of various operations and/or commands be adjusted accordingly.

For example, based on various determination(s) computed with respect to the referenced input(s), robot 100 can adjust its operation, e.g., with respect to various motor control or power control services. In doing so, robot 100 can, for example, monitor and/or account for motor controller fault conditions, sensor safety and fault conditions, e-stop and battery state.

Additionally, the described technologies can utilize inputs originating from differential drive and pose estimation services to determine stall and traction loss conditions. Based on such inputs, power can be equalized across drive wheels, e.g., in cases where equalizing power is determined to be beneficial. For example, power and/or the rotation component of output velocity can be reduced as necessary, e.g., to regain traction of the wheel/robot.

Though the described techniques are described primarily with respect to robot 100, this is only for purposes of illustration. Comparable techniques can also be employed with respect to various implements or accessories attached to robot 100, such as are depicted in FIG. 3 and/or described herein. For example, the described techniques can be employed to detect and address stall and/or traction loss with respect to wheel(s) of the robot or other elements (e.g., accessories, implements, etc.).

In another example scenario, though robot 100 is applying power to one or more wheels, the robot can be determined not to be moving (or not to be moving in a manner expected or desired, e.g., with respect to the operations or commands being performed). In certain implementations, circumstances such as soil conditions, a heavy implement attached to the robot, or other obstacle(s) proximate to the robot may contribute to the robot's difficulty to move. As a result, not only is the robot not making progress (e.g., in its navigation path or in performing other operations), but it may also be difficult for services such as the robot's navigation planner service to determine how much power may be needed to make the robot move. It also may be difficult under certain circumstances to determine if the robot's wheels are rotating.

In such a scenario, upon detecting no motion at the robot, the robot can determine (e.g., by processor(s) 150) it is not stalled, as described above. The robot can further detect no vibration and/or no rotation of one or more wheel(s) that are otherwise expected to rotate, reflecting that one or more wheels do not have enough power to break static friction. Based on such determination(s), robot 100 can be configured to adjust various aspects of its operation. For example, the robot can apply a schedule of power increases. By way of illustration, the robot can increase the power applied by 5% at every sampling interval (e.g., 100 ms, which is a 10 Hz sampling rate). Such power increases can continue until vibration is detected at the robot (e.g., via one or more sensors, reflecting vibration of the robot chassis, vibration of an implement, etc.). Such vibration can reflect that one or more wheels have enough power to rotate and overcome inertia, soil conditions, etc. Robot 100 can be further configured to stop applying power increases in certain scenarios (e.g., if power consumption reaches or exceeds a defined threshold, for safety reasons, etc.). In such a scenario (e.g., if unsafe conditions are detected) the robot can stop power to drive units.

Additionally, in certain implementations robot 100 can process information associated with prior stall and/or traction loss events, based on which the robot can compute further determination(s). For example, based on data reflecting aspects of prior stall and/or traction loss events, the robot can learn or otherwise determine location(s) and/or patterns related to such occurrences. The robot can further compute the efficacy of various techniques reflecting corrective operations employed in such scenarios, and can further employ such techniques under circumstances determined to be comparable. Moreover, such information can be aggregated across or otherwise shared among multiple robots, such as those deployed on the same or different properties, such as those owned by the same or different owners and/or otherwise applied in a similar manner.

In certain implementations, robot 100 can be further configured to operate safely and efficiently under changing conditions and environments. For example, in agricultural contexts, the robot can encounter various obstacles (e.g., rocks, tree stumps, animals, structures, etc.) at random and/or changing locations. Additionally, in certain implementations certain defined structures can dictate constraint(s) on motion of the robot (e.g., when tasked with planting rows, where the height of plants can range from as short as a few centimeters off the ground, to large trees).

As described herein, robot 100 can include or otherwise execute service(s) enabling it to detect and avoid or otherwise react to the presence of various obstacle(s). Such an obstacle avoidance or obstacle handling service (e.g., as executed by or otherwise implemented at processor(s) 150) can, for example, enable the robot to process various inputs, parameters, etc., determine open space(s), compute or plan a path for the robot to travel (e.g., to perform a defined task) that avoids such obstacles or stops at said obstacles.

In certain implementations, the referenced obstacle avoidance service or obstacle handling service can receive or obtain information from various sources. For example, the obstacle avoidance service can receive data streams or other such inputs from various sensors 160 capable of depth/distance detection (e.g., cameras, sonar, LiDAR, etc.). In certain implementations, the service can also receive or obtain inputs from GPS sensors and/or an inertial measurement unit (which can reflect acceleration, angular velocity and magnetic orientation vectors), which can enable various determinations or estimations with respect to the pose, position, orientation, direction, etc. of the robot.

The referenced obstacle avoidance service can, for example, process the received sensor inputs to generate a velocity vector (e.g., with respect to X, Y, Z axis coordinates) at a detected or defined frequency (e.g., in lieu of attempting to define a path for the robot across a global map). Such a velocity vector can be further utilized to determine open space and/or obstacles, and adjust operation of the robot accordingly, as described herein.

Figure 10:
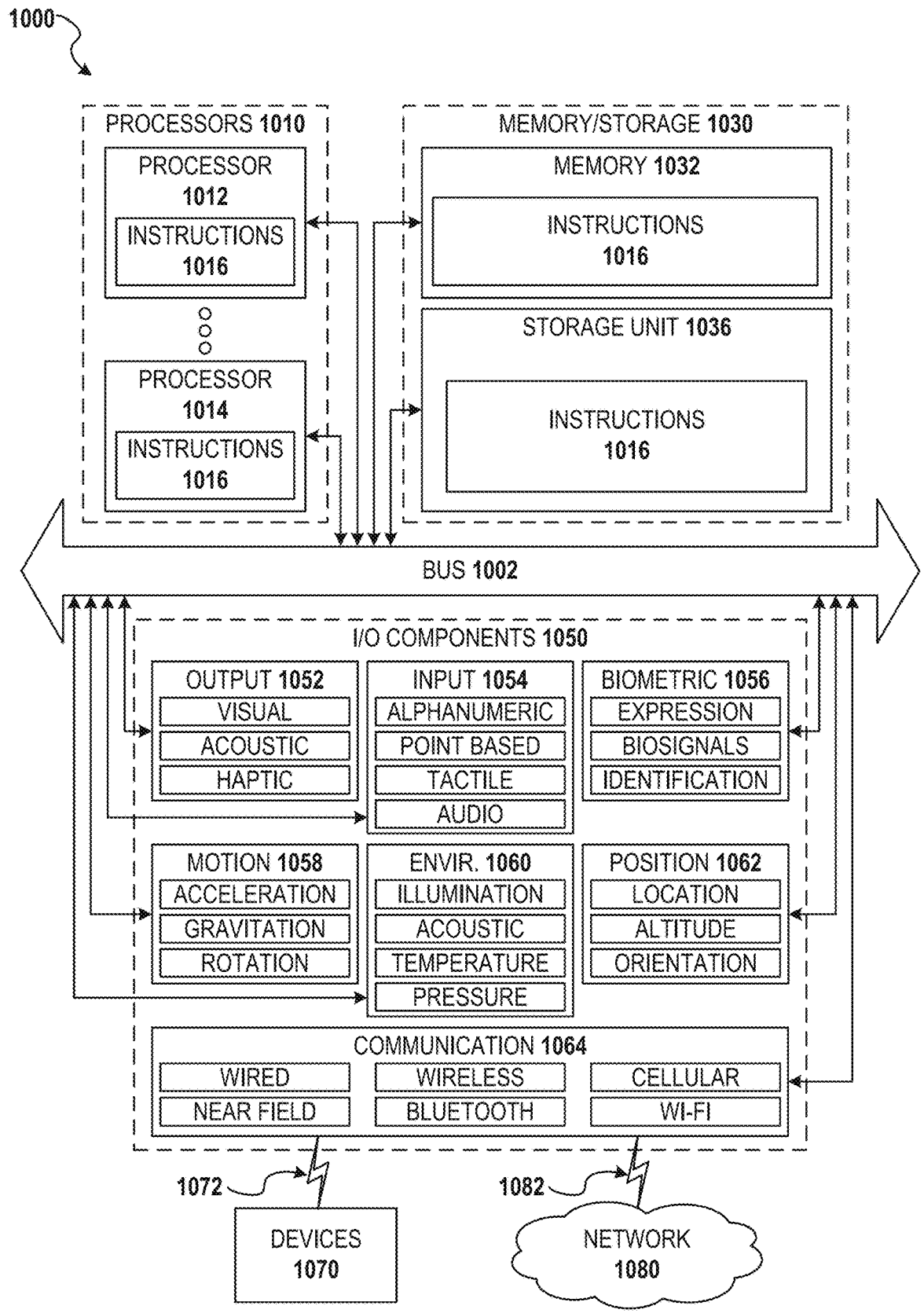
FIG. 10 is a block diagram illustrating components of a machine able to read instructions from a machine-readable medium and perform any of the methodologies discussed herein, according to an example embodiment.

As also depicted in FIG. 4, the described robot can include various communication interfaces (e.g., WiFi, Bluetooth, cellular, etc., such as are described in greater detail with respect to FIG. 10) through which the robot can send/receive commands and/or other information, e.g., via network 440. User 430 can interact with computing device 420 which can execute application 422 that can provide interface(s) through which the user can adjust various settings, parameters, etc. with respect to the operation of the robot, as described herein. Further aspects of the operation of device 420 are described in connection with FIG. 10.

Figure 5:
FIG. 5 shows a graphical user interface with a map of the movement pattern of the robot, in one example of how the robot may be programmed to traverse terrain, according to some embodiments.

FIG. 5 shows a graphical user interface 500 with a map reflecting past, present, or future movement pattern(s) of robot 100. Such patterns can reflect, for example, the manner in which robot 100 can autonomously traverse terrain, according to some embodiments.

As shown in FIG. 5, the graphical user interface 500 (which can be presented at a computing device 420 as shown in FIG. 4, such as a personal computer, smartphone, tablet, etc.) can enable a user 430 to specify or adjust certain settings associated with the movement of a robot, e.g., by selecting parameters in one or more menu(s) (such as menu 510, as overlaid in the top left portion of the map).

Graphical user interface 500 can also enable the human user to select position(s) on an overhead map. Such selected position(s) can represent waypoint(s) for the robot to travel to and, in some cases, an sequence in which to traverse them. Based on the selections provided by the user via the overhead map, the robot can generate its own the travel path (e.g., in lieu of the user needing to provide specific parameters with respect to the robot's movement, e.g., to define speed, distance, turn angles, etc.).

Figure 6A:
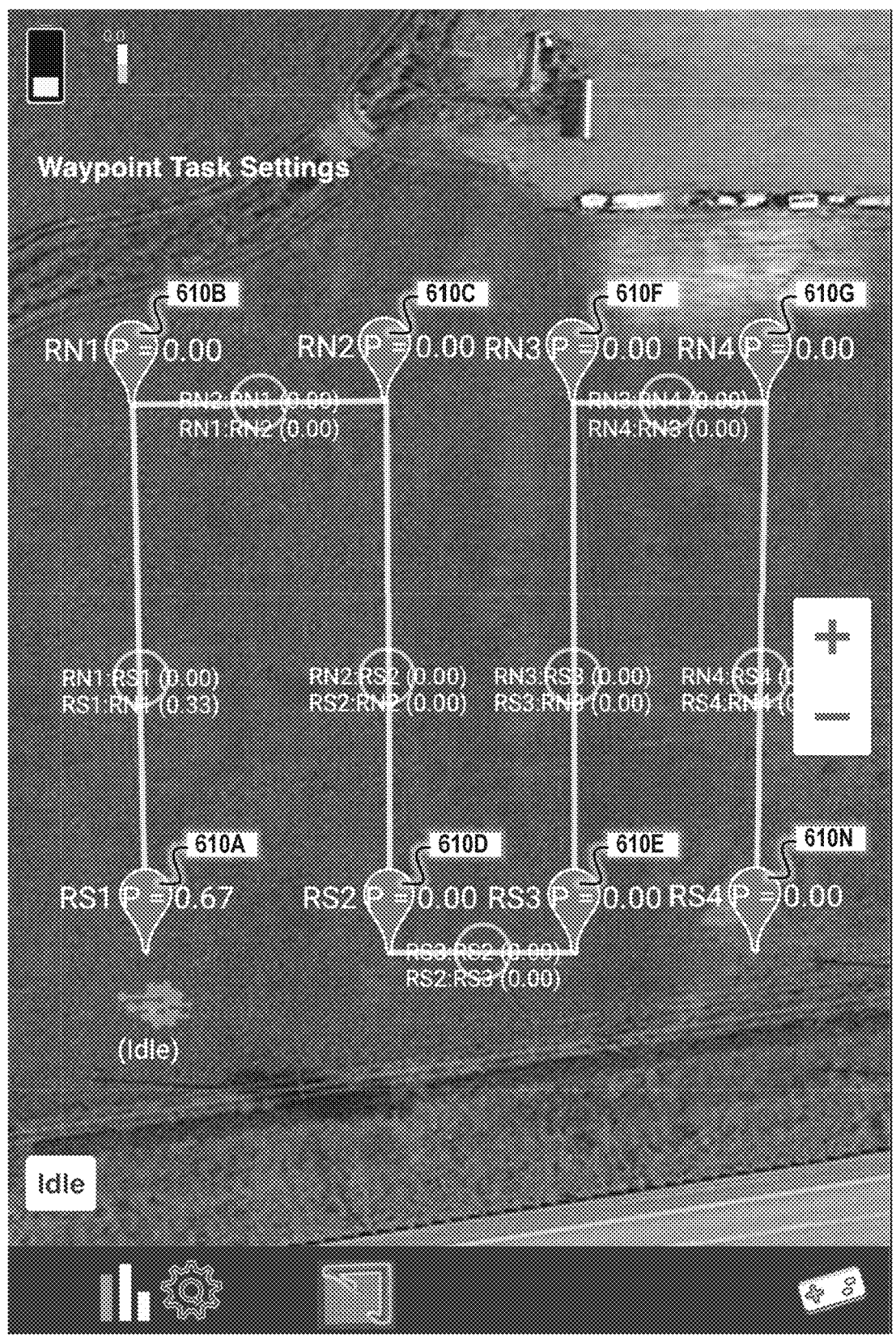
FIG. 6A shows an example waypoint travel route that is inputted by a user into the graphical user interface, according to some embodiments.

FIG. 6A shows an example waypoint travel route 600 computed by robot 100, according to some embodiments. In the depicted scenario, a user can input waypoints 610A-N via the graphical user interface. Based on such waypoints, robot 100 can compute a route connecting the waypoints. Robot 100 can further navigate to each of the waypoints via the computed route, e.g., in the order specified. The current location of robot 100 in the field can also be depicted in the graphical user interface, as shown.

Figure 6B:
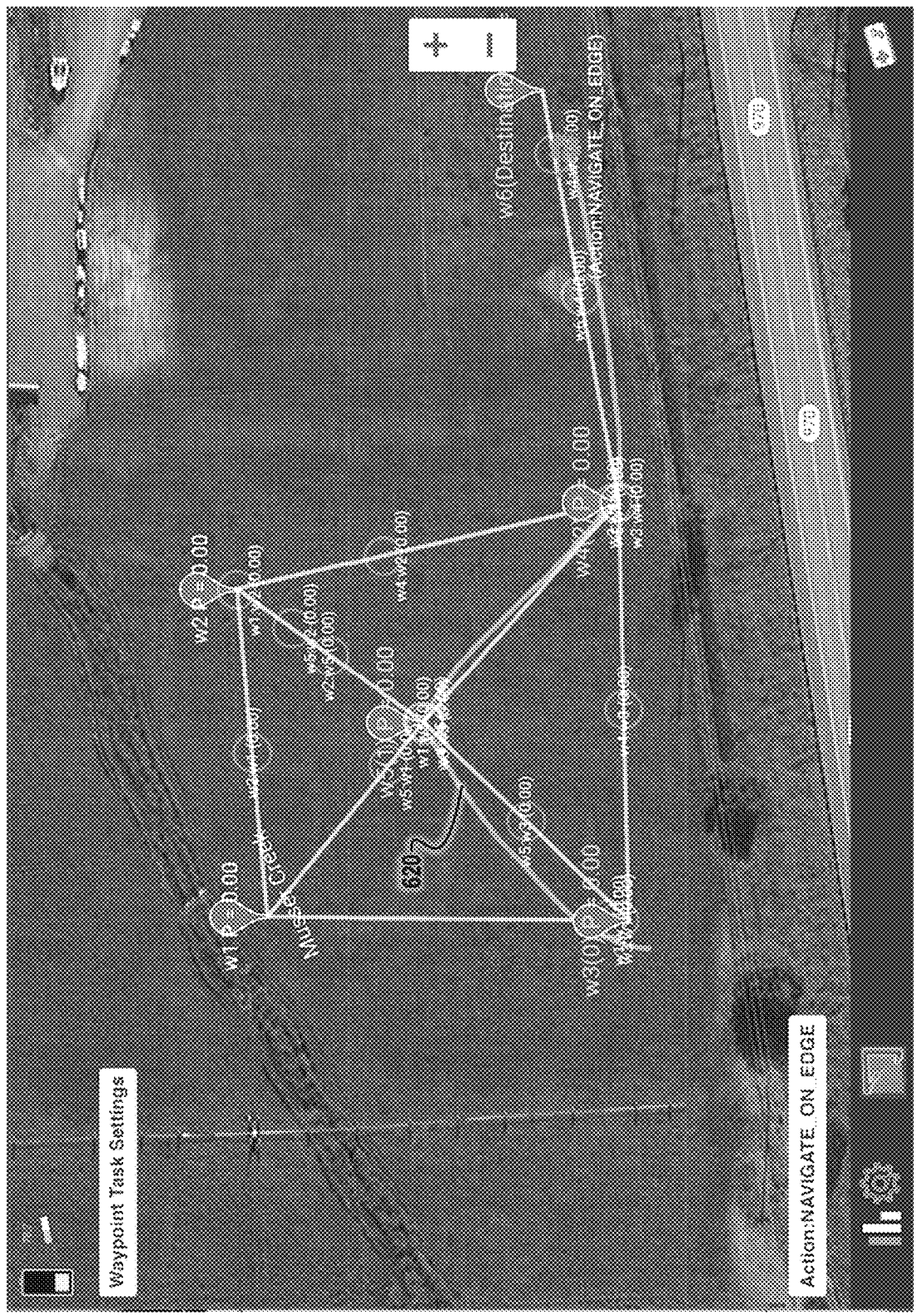
FIG. 6B shows another example travel route of the robot to a different configuration of waypoints, according to some embodiments.

FIG. 6B shows another example travel route of the robot across a different configuration of waypoints, according to some embodiments. As shown in FIG. 6B, the actual travel path 620 of robot 100 from one waypoint to another may not necessarily be a straight line (as reflected in various curved lines between certain waypoints). This is so because when traveling the computed route, the robot can encounter various obstacles, which the robot is configured to adjust for in real time. Additionally, robot 100 can account for other factors such as momentum, time efficiency, economic efficiency, safety, and can further adjust its operation and/or navigation accordingly.

For example, to enable the robot to maintain continuous momentum (which may be advantageous to avoid getting stuck in certain terrain), it may be impractical for the robot to come to a complete stop (e.g., at a waypoint) to pivot sharply towards another direction before continuing on its way, even if such pivot represents the shortest distance. Instead, based on the waypoints provided, robot 100 can compute a route or path that accounts not only for the instruction or operation currently being performed, but also for one or more subsequent operation(s). By accounting for or otherwise anticipating its future movements or operations, robot 100 can adjust such moves or operations, e.g., to enable smoother or more gradual transition(s) from one waypoint to another, thereby increasing the probability that such movements or operations can be effected as intended.

Figure 7A:
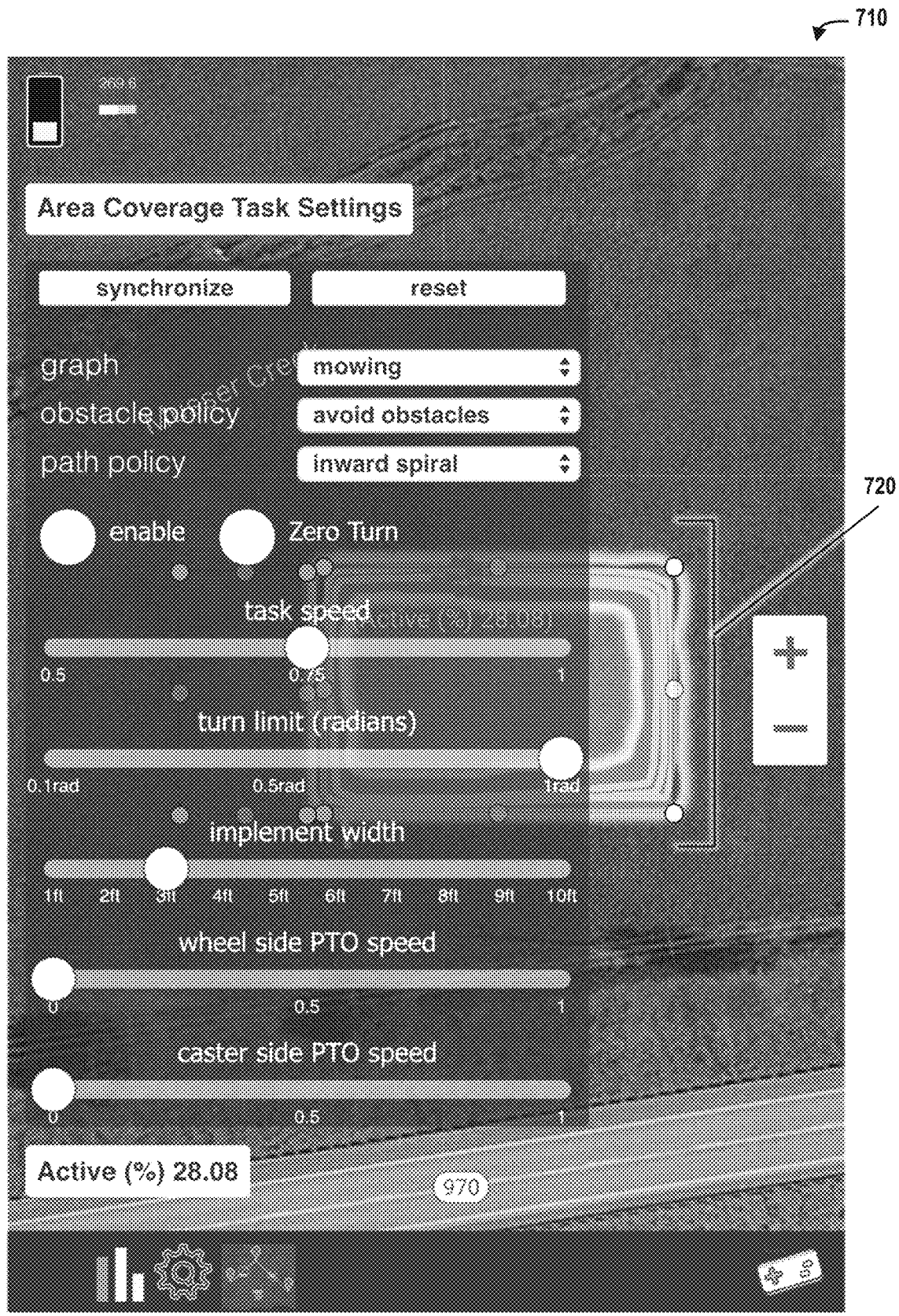
FIG. 7A shows an example of the robot navigating a two-dimensional area using a minimum energy pattern, according to some embodiments.

FIG. 7A shows an example graphical user interface 710 depicting the navigation path of robot 100 navigating a two-dimensional area using a minimum energy pattern, according to some embodiments. In addition to navigating from point to point, robot 100 can be configured to traverse a specified area, e.g., in a manner consistent with agricultural needs. In certain implementations, a user can interact with graphical user interface 710 to specify the area for the robot to travel by selecting an area of the overhead map (e.g., by outlining the perimeter of the area using a mouse cursor or via a touchscreen device).

As shown in FIG. 7A, the map can include a rectangular overlay 720 with lines spiraling inward, representing the path the robot has taken to traverse the two-dimensional area. The user interface 710 can also include a graphical overlay (as shown in FIG. 7A) which includes settings that further configure aspects of the robot's operation. For example, as shown in FIG. 7A, the "graph" setting is set to "mowing," indicating that the robot should move in a manner consistent with mowing a lawn (e.g., to traverse all of the specified area, as opposed to traveling between waypoints). The "path policy" setting reflects how the robot is to traverse the area. Here, it is set to "inward spiral," which is an efficient movement pattern to cover the entire area. As shown, the robot has started from the outer edges of the rectangle and is moving around and inwardly, in a spiral pattern.

Figure 7B:
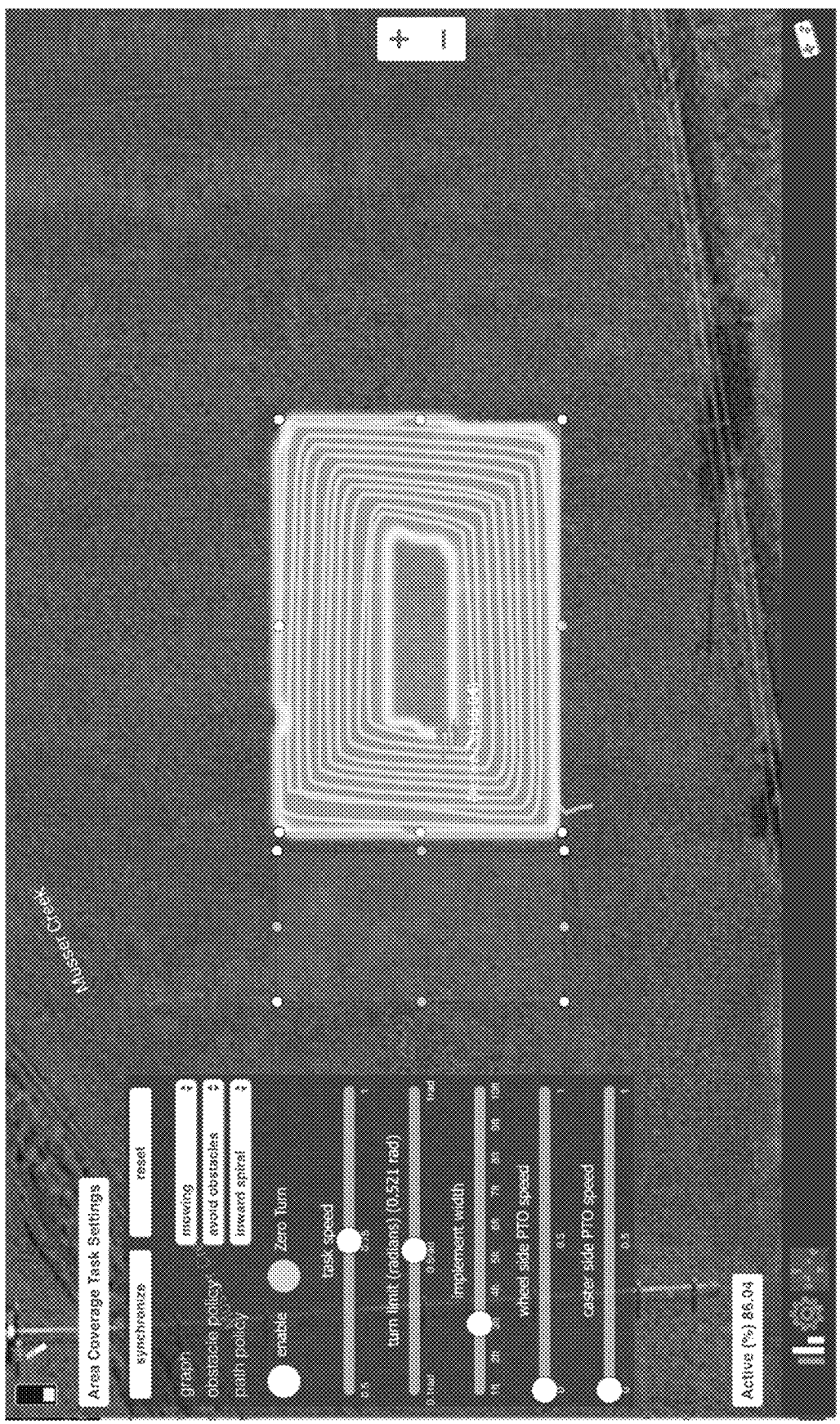
FIG. 7B shows a progression of the robot's path in the inward spiral, according to some embodiments.

FIG. 7B shows a progression of the robot's path in the inward spiral, according to some embodiments. The highlighted path on the overhead map shows how much ground the robot has covered. While the pathing is shaped in a somewhat angled inward spiral (i.e., the lines are not completely vertical or horizontal), the robot has nevertheless completely traversed the ground it is directed to cover, with only the inner space remaining. Though the area for the robot to cover can be specified via a simple graphical interface (e.g., by specifying the perimeter of an area over a map), robot 100 can be configured to translate such input(s) to determine how the specified area can be best/most efficiently traversed.

Robot 100 can be configured to detect and/or negotiate obstacles it perceives or otherwise identifies, e.g., in its path. In certain implementations, the robot can be configured to negotiate or otherwise respond to such obstacles in different ways. For example, an "obstacle policy" setting (e.g., as shown in FIG. 7B) can enable a user to configure the robot to handle such situations in different ways. For example, an "avoid obstacles" setting can direct the robot, upon detecting an obstacle, to adjust its navigation and/or other aspects of its operation to avoid the identified obstacle. Another setting can include an option to stop when encountering obstacles.

Figure 8:
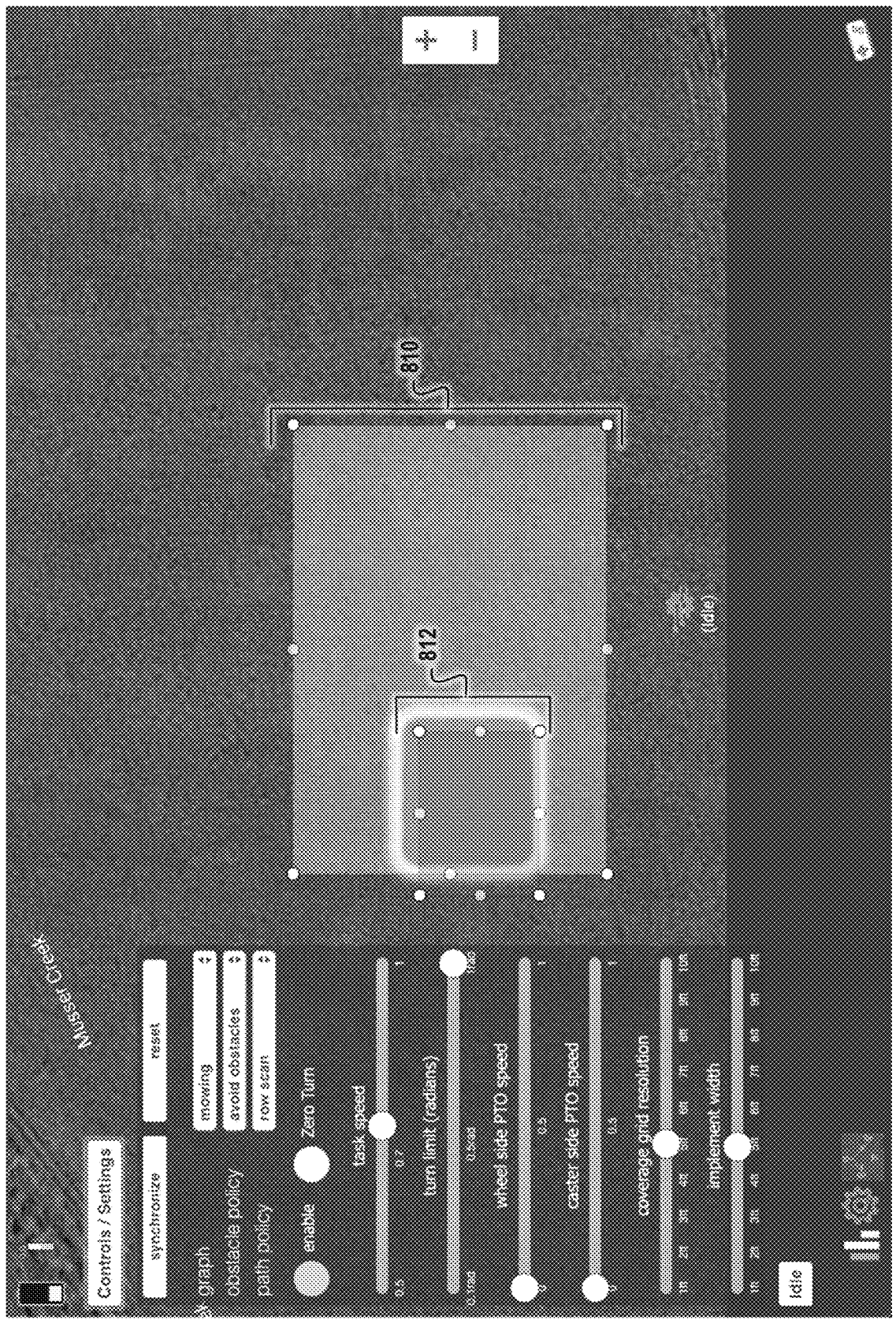
FIG. 8 shows an example of a user specifying a rectangular area to traverse, but also entering an exclusion zone within that space that the robot is to avoid, according to some embodiments.

In other implementations, robot 100 can be configured to navigate around obstacles that have been specified or defined, e.g., by a user or from a third-party database. For example, using a graphical user interface, a user can define virtual exclusion area(s) that reflect area(s) the robot is to avoid. FIG. 8 shows an example graphical user interface in which a user specifies a rectangular area 810 to traverse, while also defining an exclusion zone 812 within that space, reflecting an area the robot is to avoid. Based on such input(s), the robot can be configured to navigate around real-time obstacles (e.g., as it encounters them when traversing area 810 while avoiding the defined exclusion area 812. In doing so, robot 100 can account for obstacles detected in real time (e.g., via depth camera sensors, sonar radar, and/or other proximity sensors integrated within robot 100), while also accounting for projected, user-defined or virtual obstacles. As noted, such virtual obstacles can reflect and/or correspond to "exclusion" areas defined on a map and/or by geographic/GPS coordinates (which can overlap and/or be situated outside or inside areas in which the robot is to work).

In some embodiments, robot 100 can be configured to maneuver or operate in a manner that accounts for the described exclusion zone avoidance while detecting and avoiding obstacles in real time, and also mapping the path being traversed by the robot (e.g., as defined by a user). In doing so, robot 100 can also adjust for GPS noise/inaccuracies, as well as adjust for the robot's turning radius and/or speed, as described herein. Additionally, in certain implementations, the robot can be further configured to adjust for detected environmental conditions and/or its own momentum/speed context to create its path. Doing so can enable the robot to further reduce energy waste.

In order to simultaneously account for or otherwise "fuse" a defined exclusion zone with a robot's real-time obstacle avoidance capabilities, the described technologies can be further configured to account for sensor noise, such as GPS drifts (that is, discrepancies between a location determined by a GPS device and the real-world location of the device), compass drifts, etc.

For example, in some cases, robot 100 can be configured to identify or determine the magnetic heading error. Using inputs originating from a GPS sensor (e.g., by moving the robot a long enough distance to establish a "baseline" reflecting the GPS delta), the turn direction of motion can be determined. The referenced GPS derived heading can be associated with the magnetic heading. When the robot faces the same direction (i.e., having the same magnetic heading), the location of the robot can be adjusted using the GPS learned heading. Doing so can reduce the need for complex or redundant GPS devices or complex compasses. In some cases, multiple GPS moving baselines can be generated and correlated with a map to act as heading corrections, e.g., when the robot utilizes the map. Doing so allows, for example, for navigating during waypoint or area coverage, while reducing error, and also accurately projects the location of virtual obstacles, e.g., in relation to physical obstacles.

In some embodiments, robot 100 can dynamically adjust functionality and/or other aspects of the equipment, implements, etc. it is carrying or hauling. Such adjustments can be initiated based on and/or otherwise account for a current location of the robot and/or other environmental conditions. For example, in a scenario in which the robot determines it is to travel along a location it has already traversed, the robot can reduce or disable power to one or more implements it is pulling. In doing so, the robot can avoid unnecessarily expending energy in activating such implements over terrain that has already been traversed or worked on by the robot.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 9:
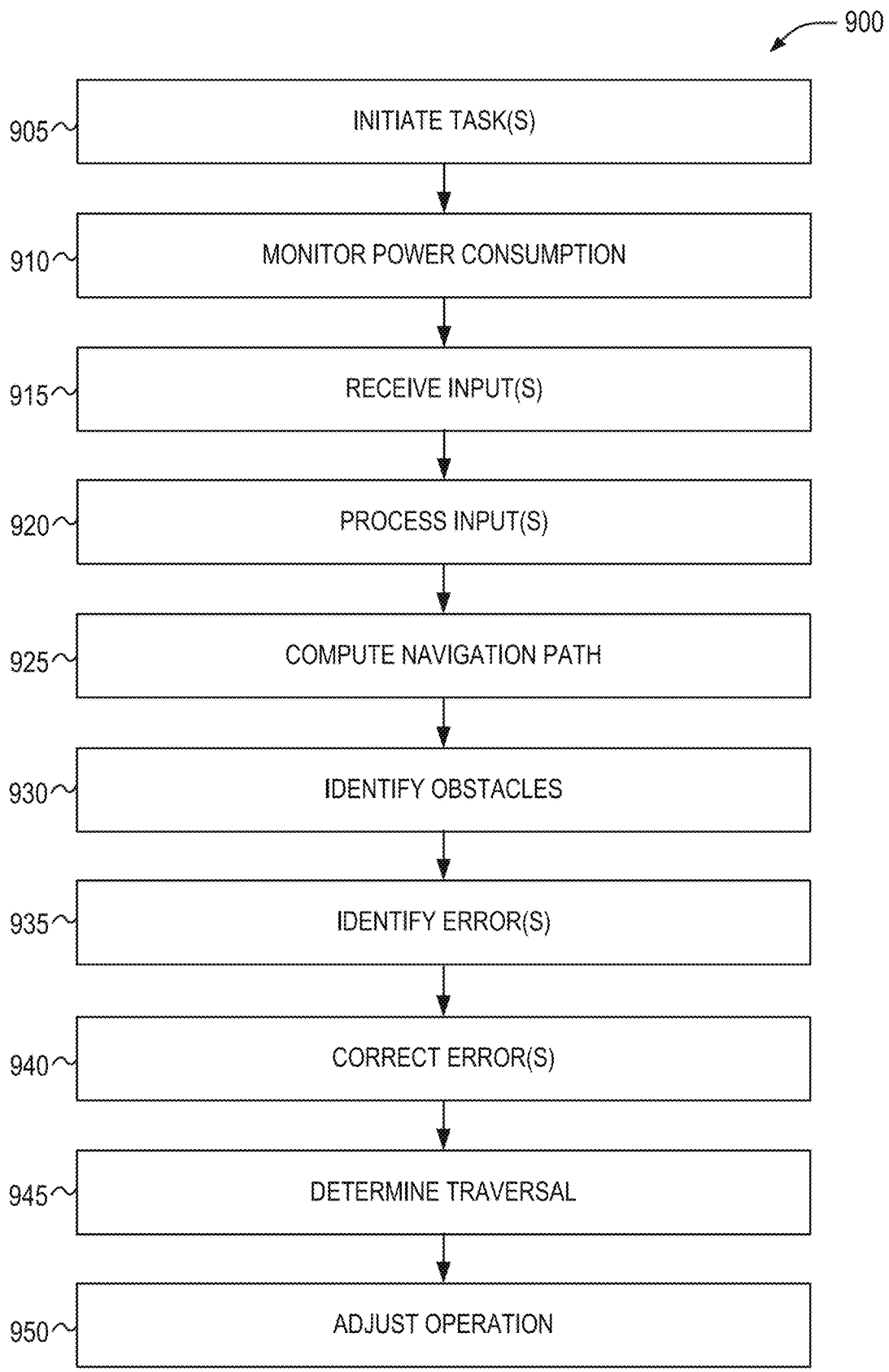
FIG. 9 is a flow chart illustrating aspects of a method, in accordance with example embodiments, for autonomous robot operation.

FIG. 9 depicts a flow chart illustrating a method 900, according to an example embodiment, for autonomous robot operation. The method is performed by processing logic that can comprise hardware (circuitry, dedicated logic, etc.), software (such as is run on a computing device such as those described herein), or a combination of both. In one implementation, the method 900 is performed by one or more elements depicted and/or described in relation to FIG. 1 (including but not limited to robot 100, processor(s) 150 of the robot executing one or more applications, instructions, commands, modules, etc.), while in some other implementations, the one or more blocks of FIG. 9 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 905, the performance of one or more tasks can be initiated, e.g., by robot 100. Such tasks can be, for example, agricultural tasks, such as are described herein (e.g., mowing, hauling, grading, security tasks, predator and depredator control, etc.). In certain implementations, robot 100 can be configured to autonomously perform such tasks (e.g., without human intervention or supervision).

At operation 910, aspect(s) of the power consumption of the robot can be monitored. For example, items such as the current amount of power stored in the robot's batter(ies) 170, available power sources, etc. can be monitored, as described herein.

At operation 915, one or more inputs can be received. Such input(s) can originate from various sensors 160 of the robot, such as are described herein. (e.g., cameras, accelerometer, magnetometer, GPS, etc.).

At operation 920, the one or more inputs (such as those received at 915) can be processed (e.g., by processor(s) 150). In doing so, an operation status of robot 100 can be determined. Such an operation status can reflect, for example, whether the robot is operating as expected or desired under certain conditions. For example, such an operation status of the robot can reflect whether wheel(s) 110 of the robot have stalled or lost traction, such as is described herein.

For example, in certain implementations input(s) originating from sensor(s) of the robot can be processed with input(s) originating from motor controller(s) 142 of the robot (each of which can control rotation of the robot's wheel(s)), to determine such an operation status of the robot (e.g., whether the robot has stalled, lost traction, whether its wheel(s) are not rotating, whether its wheels are rotating while the robot is determined not to be moving laterally, etc.). By way of illustration, input(s) originating from such motor controller(s) (reflecting, for example, voltage consumed by the controllers can be processed to determine that at least one of the robot's wheels is not rotating in performance of one or more task(s) the robot is performing or attempting to perform).

By way of further example, in certain implementations movement(s) of the robot (as determined in connection with rotation(s) of wheel(s) of the robot can be compared with expected movement(s) of the robot with respect to such rotation(s) of the robot's wheel(s). By way of illustration, input(s) originating from motor controller(s) of the robot (e.g., reflecting voltage consumed by such motor controller(s) in performance of task(s) the robot is performing or attempting to perform) can be compared with estimated voltage(s) computed with respect to the performance of such task(s). Based on the comparison, an operation status of the robot (e.g., whether the robot has stalled, lost traction, etc.) can be determined.

At operation 925, a navigation path for the robot can be computed. In certain implementations, such a navigation path can be computed with respect to various waypoints (e.g., user-defined waypoints) and various task(s) (e.g., agricultural tasks such as mowing, etc.), such as is described herein. In certain implementations, the referenced path can be computed to prioritize or be optimal with respect to certain criteria and/or constraints (e.g., distance, economic, time, safety, likelihood of success, etc.).

At operation 930, one or more obstacles can be identified. in certain implementations, such obstacles can be identified by processing input(s) originating from sensor(s) of the robot (e.g., cameras, sonar, LiDAR, etc.) to identify such obstacles. In other implementations, such obstacle(s) can be identified with respect to geographic area(s) designated (e.g., by a user, from a $3^{rd}$ party database) as obstacles with respect to the robot, such as is described herein.

At operation 935, error(s) or discrepancies can be identified, e.g., with respect to input(s) originating from a first sensor (e.g., a GPS sensor, magnetometer, etc.). Such error(s) can reflect, for example, GPS or compass noise/inaccuracies ("drifts"), as described herein.

At operation 940, the identified errors (e.g., at 935) can be corrected or otherwise accounted for. In certain implementations, such error(s) can be corrected based on other input(s) originating from other sensor(s) (e.g., GPS, magnetometer, etc.) that correspond to the inputs with respect to which error(s) or discrepancies were detected (e.g., at 935), such as is described herein. For example, using inputs originating from a GPS sensor (e.g., which establish a "baseline" reflecting a GPS delta), a derived GPS heading can be associated with a magnetic heading. When the robot faces the same direction (i.e., having the same magnetic heading), the location of the robot can be adjusted using the GPS learned heading, as described herein.

In certain implementations, the referenced error(s) can be corrected by learning the error(s) and applying an appropriate correction. For example, to learn magnetic error, the robot can perform or repeat various operations (e.g., in a continuous loop, at 1 Hz or faster) including: acquiring a magnetic heading from a magnetic sensor (magnetometer/IU). If the robot is determined not to be in motion, the acquired magnetic heading can be used as the robot's heading. Alternatively, if the robot is in motion and has translated enough within a defined time period (e.g., "N" seconds), a geodesic baseline (a line on the surface of the earth) can be computed, e.g., between a prior GPS position (e.g., N seconds in the past), and the current GPS position. The GPS position error should be within a defined margin (e.g., 5%) of the distance traveled by the robot. If the distance traveled is less (or there is not enough data to make such a determination), the magnetic heading can be used as the robot's heading. If the robot has translated sufficiently, the magnetic headings can be averaged (e.g., at 100 ms resolution across the previous N seconds) and the computed average magnetic heading (or such readings can be filtered, e.g., using a filtering technique that accounts for inputs across time) can be compared with the heading as derived or determined from the referenced GPS baseline. The error between the GPS heading and the magnetic heading can be determined and associated with the current location of the robot (and added to a record of other errors for such location, which can be adjusted over time, e.g., reflecting a rolling average over N samples)

Based on such determined errors, a correction can be applied (as noted, if a location error is not determined based on magnetic headings and GPS headings, no correction may need to be applied). Upon identifying one or more locations or location clusters of GPS corrections, the weight of the appropriate location correction(s) can be determined, e.g., by applying a gaussian function to the robot's current magnetic heading. The closest identified cluster of GPS correction(s) can be assigned a higher weight. Corrections can be averaged over all clusters and a correction over the current magnetic heading of the robot can be computed, and such computed corrected magnetic heading can be used as the robot's heading, as described herein.

The accuracy of the described techniques can improve as GPS accuracy improves. Doing so can enable the robot to determine its true north direction in a given location even without input from the user or external sources. In addition, the described techniques enable the robot to learn and adjust for local magnetic distortions with arbitrary spatial precision.

At operation 945, it can be determined (e.g., by processor(s) 150) that the robot has traversed at least a portion of a navigation path (e.g., the navigation path computed at 925). For example, upon determining the robot is to travel along a location it has already traversed, the robot can reduce or disable power to implement(s) it is pulling (which may draw additional power). In doing so, the robot can avoid unnecessarily expending energy in activating such implements over terrain that has already been traversed or worked on by the robot.

At operation 950, aspect(s) of the performance of one or more task(s) can be adjusted. In certain implementations, such adjustments can be implemented based on aspect(s) of the robot's power consumption (e.g., as monitored at 910) and input(s) originating from various sensor(s) (e.g., as received at 915).

Adjusting aspects of the performance of such tasks can include, for example, stopping operation of the robot based on a determination that the robot's power level reaches (or is below) a defined threshold. In another example, under such circumstances, the robot can navigate to a location and/or an orientation and/or can adjust the position of its solar panel(s) in a manner determined to be associated with advantageous solar exposure (e.g., to facilitate solar charging).

In another example, based on an operation status of the robot (e.g., as determined at 920), power applied to at least one wheel of the robot can be decreased or reduced (e.g., to enable the wheel(s) to regain traction). Alternatively, based on such a determined operation status of the robot, a turn radius of one or more wheels of the robot can be increased (e.g., to balance power more evenly across wheels of the robot), as described herein.

By way of further example, based on an operation status of the robot (e.g., as determined at 920), power applied to one or more wheel(s) of the robot that are not rotating (or did not rotate in previous instances) can be increased. Upon subsequently determining that such wheel(s) have begun rotating, the power applied to such wheel(s) can be reduced.

In another scenario, based on a determination (e.g., at 945) that the robot has already traversed at least a portion of its navigation path, aspects of the robot's operation can be adjusted with respect to implement(s) attached to or associated with the robot.

In other scenarios, inputs received through a user interface (e.g., as provided by a user) can be processed and serve as "hints" reflecting power operating limits associated with an accessory, implement, etc. Doing so can enable the robot to further determine when to adjust or stop autonomous operation, e.g., when such limits are approached or exceeded (such as when the power being drawn by the implement is significantly above or below such limits, reflecting that the implement is likely not operating properly).

The robot can also determine or learn (e.g., through statistical analysis of power draw) an expected energy use by an implement, e.g., at a certain power setting. Based on such a determination, the robot can take action, adjust operation(s), etc., when there is a significant deviation from such expected energy usage (e.g., deviation from the mean). Doing so can improve power utilization and increase safety associated with such implements, attachments, etc.

In yet another scenario, based on various obstacle(s) (as identified at 930) one or more, aspect(s) of the navigation of the robot can be adjusted in relation to the navigation path (e.g., as computed at 925).

It should also be noted that while various aspects of the described technologies are described with respect to robots configured to perform agricultural tasks, such descriptions are provided by way of example and the described technologies can also be applied in many other contexts, settings, and/or industries. For example, the described technologies can also be implemented in settings/contexts in which other types of robots, machines, vehicles, etc. perform autonomous and/or supervised tasks, operations, etc., such as for security, predator and depredator control, construction, and garbage collection/removal.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a processor or other programmable processor. Once configured by such software, hardware modules become specific machines (or specific components of a machine) uniquely tailored to perform the configured functions. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a processor configured by software to become a special-purpose processor, the processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described herein are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 10 is a block diagram illustrating components of a machine 1000, according to some example implementations, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. The instructions 1016 transform the machine into a particular machine programmed to carry out the described and illustrated functions in the manner described. In alternative implementations, the machine 1000 operates as a standalone device or can be coupled (e.g., networked) to other machines. In a networked deployment, the machine 1000 can operate in the capacity of a server machine or a client machine in a server-client network environment, or as a peer machine in a peer-to-peer (or distributed) network environment. The machine 1000 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory/storage 1030, and I/O components 1050, which can be configured to communicate with each other such as via a bus 1002. In an example implementation, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1012 and a processor 1014 that can execute the instructions 1016. The term "processor" is intended to include multi-core processors that can comprise two or more independent processors (sometimes referred to as "cores") that can execute instructions contemporaneously. Although FIG. 10 shows multiple processors 1010, the machine 1000 can include a single processor with a single core, a single processor with multiple cores (e.g., a multi-core processor), multiple processors with a single core, multiple processors with multiples cores, or any combination thereof.

The memory/storage 1030 can include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 can also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions (e.g., instructions 1016) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 can include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 can include many other components that are not shown in FIG. 10. The I/O components 1050 are grouped according to functionality merely for simplifying the following discussion and the grouping is in no way limiting. In various example implementations, the I/O components 1050 can include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 1050 can include biometric components 1056, motion components 1058, environmental components 1060, or position components 1062, among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 can include acceleration sensor components (e.g., accelerometer), gravitation sensor components, rotation sensor components (e.g., gyroscope), and so forth. The environmental components 1060 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 1062 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1050 can include communication components 1064 operable to couple the machine 1000 to a network 1080 or devices 1070 via a coupling 1082 and a coupling 1072, respectively. For example, the communication components 1064 can include a network interface component or other suitable device to interface with the network 1080. In further examples, the communication components 1064 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 can be another machine or any of a wide variety of peripheral devices (e.g., a peripheral device coupled via a USB).

Moreover, the communication components 1064 can detect identifiers or include components operable to detect identifiers. For example, the communication components 1064 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1064, such as location via Internet Protocol (IP) geolocation, location via Wi-Fi® signal triangulation, location via detecting an NFC beacon signal that can indicate a particular location, and so forth.

In various example implementations, one or more portions of the network 1080 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 can include a wireless or cellular network and the coupling 1082 can be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 can be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 can be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A robot comprising:
one or more sensors;
a processing device; and
a memory coupled to the processing device and storing instructions that, when executed by the processing device, cause the robot to perform operations comprising:
initiating performance of one or more tasks;
monitoring one or more aspects of the power consumption of the robot;
receiving one or more inputs originating from at least one of the one or more sensors; and
based on (a) the one or more aspects of the power consumption of the robot and (b) one or more inputs originating from at least one of the one or more sensors, adjusting one or more aspects of the performance of the one or more tasks.

2. The robot of claim 1, wherein the memory further stores instructions that, when executed by the processing device, further cause the robot to perform operations comprising:
processing the one or more inputs originating from the at least one of the one or more sensors to determine an operation status of the robot.

3. The robot of claim 2, wherein the operation status comprises a scenario in which one or more wheels of the robot are not rotating.

4. The robot of claim 2, wherein the operation status comprises a scenario in which one or more wheels of the robot are rotating while the robot is determined not to be moving forward or backward.

5. The robot of claim 2, wherein processing the one or more inputs comprises comparing (a) one or more movements of the robot as determined in connection with one or more rotations of one or more wheels of the robot with (b) one or more expected movements of the robot in relation to the one or more rotations of the one or more wheels.

6. The robot of claim 2, wherein adjusting one or more aspects of the performance of the one or more tasks comprises adjusting power applied to at least one wheel of the robot.

7. The robot of claim 2, wherein processing the one or more inputs originating from the at least one of the one or more sensors to determine an operation status of the robot further comprises processing (a) the one or inputs originating from the one or more sensors and (b) one or more inputs originating from one or more motor controllers of the robot to determine an operation status of the robot.

8. The robot of claim 7, wherein the one or more inputs originating from the one or more motor controllers reflect voltage sensed across one or more motor leads.

9. The robot of claim 2, wherein processing the one or more inputs originating from the at least one of the one or more sensors to determine an operation status of the robot further comprises:
comparing (a) one or more inputs originating from one or more motor controllers of the robot, the one or more inputs reflecting voltage consumed by the one or more motor controllers in performance of the one or more tasks, with (b) an estimated voltage computed with respect to performance of the one or more tasks; and
determining an operation status of the robot based on the comparison.

10. The robot of claim 2, wherein processing the one or more inputs originating from the at least one of the one or more sensors to determine an operation status of the robot further comprises processing one or more inputs originating from one or more motor controllers of the robot to determine that at least one of the one or more wheels is not rotating in performance of the one or more tasks.

11. The robot of claim 10, wherein adjusting one or more aspects of the performance of the one or more tasks comprises increasing the power applied to the at least one of the one or more wheels that is not rotating.

12. The robot of claim 1, wherein adjusting one or more aspects of the performance of the one or more tasks further comprises based on a determination that one or more wheels are rotating, reducing the power applied to at least one of the one or more wheels.

13. The robot of claim 1, wherein the memory further stores instructions that, when executed by the processing device, further cause the robot to perform operations comprising:
identifying one or more obstacles.

14. The robot of claim 13, wherein identifying one or more obstacles comprises processing the one or inputs originating from the one or more sensors to identify the one or more obstacles.

15. The robot of claim 1, wherein the memory further stores instructions that, when executed by the processing device, further cause the robot to perform operations comprising:
identifying one or more errors with respect to inputs originating from a first one of the one or more sensors; and
correcting the one or more errors based on inputs originating from a second one of the one or more sensors that correspond to the inputs originating from the first one of the one or more sensors.

16. The robot of claim 1, wherein the memory further stores instructions that, when executed by the processing device, further cause the robot to perform operations comprising:
computing a navigation path for the robot with respect to one or more waypoints and the one or more tasks.

17. The robot of claim 16, wherein the memory further stores instructions that, when executed by the processing device, further cause the robot to perform operations comprising:
determining that the robot has traversed at least a portion of the computed navigation path;
wherein adjusting one or more aspects of the performance of the one or more tasks comprises adjusting, based on the determination, one or more aspects of the operation of the robot with respect to one or more implements.

18. The robot of claim 1, wherein the memory further stores instructions that, when executed by the processing device, further cause the robot to perform operations comprising:
- computing a navigation path for the robot with respect to one or more waypoints and the one or more tasks; and
- identifying one or more obstacles;
- wherein adjusting one or more aspects of the performance of the one or more tasks comprises adjusting, based on the identified one or more obstacles, one or more aspects of the navigation of the robot in relation to the computed navigation path.

19. A method comprising:
- initiating performance of one or more tasks;
- monitoring one or more aspects of the power consumption of a robot;
- receiving one or more inputs originating from at least one of one or more sensors of the robot;
- comparing (a) one or more inputs originating from one or more motor controllers of the robot, the one or more inputs reflecting voltage consumed by the one or more motor controllers in performance of the one or more tasks, with (b) an estimated voltage computed with respect to performance of the one or more tasks;
- determining an operation status of the robot based on the comparison; and
- based on (i) the one or more aspects of the power consumption of the robot, (ii) one or more inputs originating from at least one of the one or more sensors, and (iii) the determined operation status of the robot, adjusting one or more aspects of the performance of the one or more tasks.

20. A non-transitory computer readable medium having instructions stored thereon that, when executed by a processing device, cause the processing device to perform operations comprising:
- initiating performance of one or more tasks;
- monitoring one or more aspects of the power consumption of the robot;
- receiving one or more inputs originating from at least one of the one or more sensors;
- processing one or more inputs originating from one or more motor controllers of the robot to determine that at least one of the one or more wheels is not rotating in performance of the one or more tasks; and
- based on (a) the one or more aspects of the power consumption of the robot, (b) one or more inputs originating from at least one of the one or more sensors, and (c) the determination that the at least one of the one or more wheels is not rotating in performance of the one or more tasks, increasing the power applied to the at least one of the one or more wheels that is not rotating.

* * * * *